United States Patent [19]
Ashfield

[11] 3,734,259
[45] May 22, 1973

[54] LIQUID COOLED CLUTCHES

[75] Inventor: Herbert Edward Ashfield, Meltham, England

[73] Assignee: David Brown Tractors Limited, Huddersfield, England

[22] Filed: July 2, 1971

[21] Appl. No.: 159,305

[30] Foreign Application Priority Data

July 10, 1970  Great Britain......................33,566/70
Feb. 15, 1971  Great Britain........................4,685/71

[52] U.S. Cl. ...............................192/113 B, 192/48.8
[51] Int. Cl................................................F16d 13/72
[58] Field of Search ....................................192/113 B

[56] References Cited

UNITED STATES PATENTS 3,104,746  9/1963  Gadd et al..........................192/113 B
3,366,210  1/1968  Webster............................192/113 B

FOREIGN PATENTS OR APPLICATIONS 232,144   3/1911   Germany......................192/113 B
742,120   2/1933   France.........................192/113 B
894,029   12/1944  France.........................192/113 B Primary Examiner—Benjamin W. Wyche
Attorney—James E. Nolan et al.

[57] ABSTRACT

An engine/clutch combination has an engine driven flywheel on which is mounted a clutch mechanism for disengagably connecting the flywheel to a shaft. A clutch housing, the lower portion of which forms a sump containing oil, envelops the flywheel and clutch mechanism and has a trough within it forming a well which accommodates the lower portions of said flywheel and clutch mechanism. An aperture is formed in the trough for allowing oil to flow from the sump to an annular groove formed in that face of the flywheel remote from the clutch, from which it flows via a passage in the flywheel remote from the clutch, mechanism and thence to the trough. The oil is flung out of the trough by the rotation of the flywheel and clutch mechanism, collected by a gutter in the upper part of the clutch housing and made available for recirculation.

18 Claims, 2 Drawing Figures

PATENTED MAY 22 1973

3,734,259

INVENTOR

HERBERT EDWARD ASHFIELD

BY

NORRIS & PATEMAN - ATTORNEY 3,734,259

LIQUID COOLED CLUTCHES

BACKGROUND OF THE INVENTION

The invention relates to engine/clutch combinations, particularly but not exclusively for land vehicles, and has for its object to enable a wet clutch, which requires a copious supply of oil for lubrication and cooling at times of engagement and disengagement, to be employed without the need for a separate pump to supply said oil.

SUMMARY OF THE INVENTION

According to the invention, an engine/clutch combination comprises an engine flywheel, a shaft co-axial with the flywheel, clutch mechanism for disengagably connecting the flywheel to the shaft, a clutch housing enveloping the flywheel and the clutch mechanism and acting at its base as a sump, a trough within the housing forming a well accommodating the lower portions of the flywheel and the clutch mechanism and surrounded by oil in the sump, an aperture in the trough adjacent that face of the flywheel remote from the clutch mechanism, an annular groove in said face of the flywheel for receiving oil flowing through the aperture from the sump, at least one passage in the flywheel for delivering oil from the groove to the clutch mechanism and means for collecting oil flung from the trough by the flywheel and the clutch mechanism and preventing its direct return to the trough.

BRIEF DESCRIPTION OF DRAWINGS

Preferred embodiments of the invention will now be described, by way of example only, with reference to the accompanying drawing wherein.

DESCRIPTION OF PREFERRED EMBODIMENTS

Figure 1:
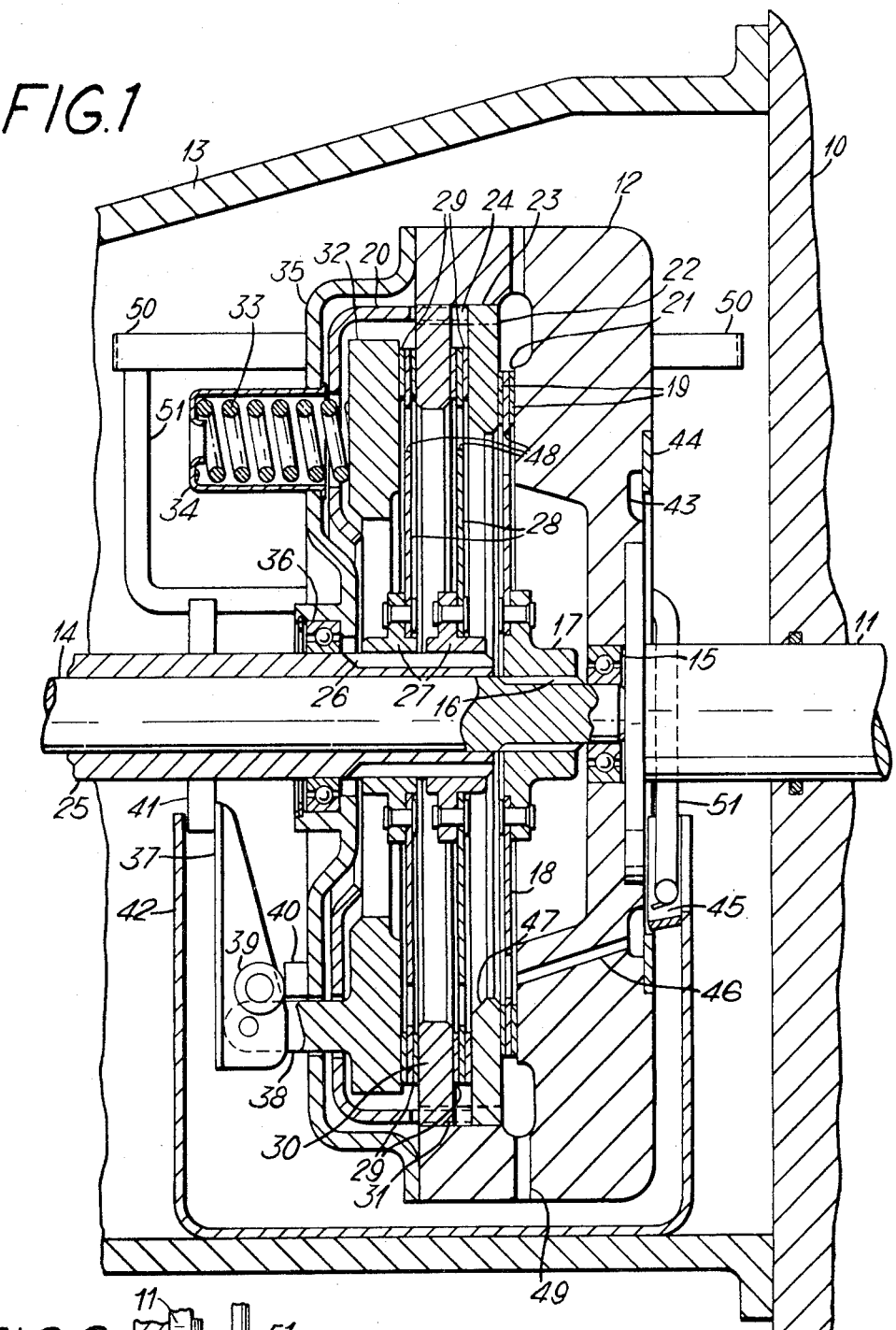
FIG. 1 is a sectional side elevation of an engine/clutch combination of an agricultural tractor.

Referring now to FIG. 1, an agricultural tractor has a four-cylinder diesal engine 10 including a crankshaft 11 and a flywheel 12 secured to the crankshaft 11. A clutch housing 13 envelops the flywheel 12 and part of a power take-off shaft 14 co-axial with the crankshaft 11, that end of the power take-off shaft adjacent the crankshaft 11 being carried by a bearing 15 housed in the flywheel 12. The power take-off shaft 14 is provided with external splines 16 near its end adjacent the crankshaft 11, on which there is slidably mounted a hub 17 to which there is rivetted a clutch plate 18 having sintered bronze linings 19. Said plate is frictionally engaged, by a first set of helical compression springs (not shown) acting through a dished annular member 20, between a face 21 on the flywheel 12 and a pressure plate 22 having external teeth 23 which engage slidably with internal teeth 24 formed in the flywheel 12. Surrounding the power take-off shaft 14 is a sleeve 25 which constitutes the input shaft of the tractor's power transmission gearbox (not shown). That end of the sleeve 25 adjacent the crankshaft 11 is provided with external splines 26 on which there are slidably mounted two hubs 27 to each of which there is rivetted a clutch plate 28 having sintered bronze linings 29. Interposed between the two clutch plates 28 carried by the sleeve 25 is a pressure plate 30 having external teeth 31 which engage slidably with the internal teeth 24 formed in the flywheel 12. One of the two clutch plates 28 is frictionally engaged between the pressure plates 22, 30, and the other of the two clutch plates 28 is frictionally engaged between the pressure plate 30 and a main pressure plate 32 interposed between said other of the clutch plates 28 and the dished annular member 20, by a second set of helical compression springs 33 acting on the main pressure plate 32. The first set of springs (not shown) and the second set of springs 33 are housed in cups 34 carried by a casing 35 secured to the flywheel 12, and said casing houses a bearing 36 carrying the sleeve 25 on that side of its clutch plates 18, 28 remote from the flywheel 12. Three angularly-spaced levers 37 are pivotably mounted between respective pairs of axially-projecting lugs 38 formed integrally on the main pressure plate 32. Each lever 37 carries a roller 39 which engages an abutment 40 secured to the casing 35, and conventional foot-pedal-operated clutch throw-out means (not shown) are provided including an axially-movable ring 41 which contacts the radially inner ends of the levers 37. Initial movement of the ring 41 towards the flywheel 12 moves the main pressure plate 32 away from the flywheel 12 against the action of the second set of springs 33 and disengages the two clutch plates 28 carried by the sleeve 25. Further movement of the ring 41 towards the flywheel 12 causes the main pressure plate 32 to move further away from the flywheel 12 and carry the dished annular member 20 with it so as to disengage the clutch plate 18 carried by the power take-off shaft 14, said further movement of the ring 41 being in opposition to the combined action of the first set of springs (not shown) and the second set of springs 33. Movement of the ring 41 away from the flywheel 12 causes sequential re-engagement of the clutch plate 18 carried by the power take-off 14 and the two clutch plates 28 carried by the sleeve 25.

A sheet metal trough 42 in the form of a segment of a cylinder is secured within the base of the clutch housing 13 to form a well accommodating the lower portions of the flywheel 12 and the clutch mechanism, and is surrounded by oil. The purpose of the trough 42 is to enable the clutch mechanism to be lubricated and cooled as hereinafter described with negligible drag compared with that which would be experienced if the flywheel 12 and the clutch mechanism were simply partially immersed in oil. An annular groove 43 is formed in that face of the flywheel 12 remote from the clutch mechanism, and an annular plate 44 secured to the flywheel 12 projects radially inwards over the outer part of said groove. A notch 45 having a radius fractionally smaller than the radius of the annular plate 44 is formed in the rim of the trough 42, adjacent said face of the flywheel 12 and vertically below the center-line of the crankshaft 11, and has a lip overhanging the annular groove 43. A plurality of radially outwardly inclined holes 46 are drilled through the flywheel 12 from the outer part of the annular groove 43. The pressure plate 22 has a conical internal surface 47 on that side adjacent the pressure plate 30, apertures 48 are provided in each of the clutch plates 18, 28, and circumferentially-spaced radial vent holes 49 are drilled between the interior of the flywheel 12 and its periphery. A horizontal sheet metal gutter 50 having closed ends is rivetted to one side of the clutch housing 13 within the upper part thereof, and its ends extend beyond the ends of the flywheel 12 and the clutch mechanism. As the flywheel 12 rotates in a clockwise direction viewed from the engine 10, the gutter 50 is rivetted to the right-hand side, viewed from the same direction, of the clutch housing 13. A deflector surface (not shown) is formed on the left-hand side, viewed from said direction, of the clutch housing 13, within the upper part thereof. A pipe 51 leads from that end of the gutter 50 remote from the flywheel 12 to a point immediately above the lip of the notch 45.

In operation, oil flows through the notch 45 from the clutch housing 13 into the annular groove 43 in the flywheel 12, and thence due to the action of centrifugal force through the inclined holes 46 to the clutch mechanism. The conical internal surface 47 on the pressure plate 22 assists in delivering oil to the two clutch plates 28 carried by the sleeve 25, and the apertures 48 in the clutch plates 18, 28 permit the oil to reach all of their working surfaces. The oil then escapes from the interior of the flywheel 12 through the radial vent holes 49 to the trough 42, from which it is flung by the rotation of the flywheel 12 and the clutch mechanism into the upper part of the clutch housing 13 where, aided by the deflector surface (not shown), it collects in the gutter 50 and returns through the pipe 51 to augment the flow of oil from the clutch housing 13 into the annular groove 43. The prime purpose of the pipe 51 is to maintain lubrication and cooling of the clutch mechanism when the tractor is climbing a gradient, in which case the oil in the clutch housing 13 runs to that end of said housing remote from the engine 10 and ceases to flow through the notch 45. However, the oil in the gutter 50 runs to that end of the gutter 50 to which the pipe 51 is connected and thence via the pipe 51 and the lip of the notch 45 to the annular groove 43, and thus the circulation of oil is maintained. The problem does not arise when the tractor is descending a gradient, as the oil in the clutch housing 13 runs to that end of said housing adjacent the notch 45 in the trough 42 and an ample supply of oil to the clutch mechanism is thereby assured. The use of the notch 45 of large radius assists in maintaining the supply of oil to the annular groove 43 when the tractor tilts sideways, for example during ploughing or working on sidling land.

Figure 2:
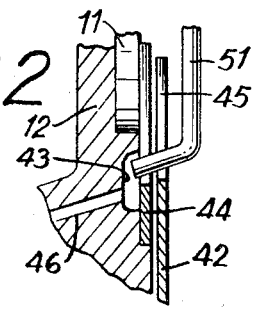
FIG. 2 is a fragmentary sectional view showing a further embodiment.

In modification, where the engine/clutch combination is not subject to changes in attitude as, for example, in a stationary installation, the pipe 51 is dispensed with and the gutter 50 has open ends from which oil flows back into the clutch housing 13 beyond the ends of the flywheel 12 and the clutch mechanism. In another modification, more than one gutter 50 is provided. In a further modification, so-called "paper" linings are employed instead of sintered bronze linings. In yet another modification shown in FIG. 2, the lip (but not the notch) is dispensed with and the pipe discharges oil directly into the annular groove. In yet a further modification, the notch is replaced by a hole. The numbers of clutch plates on the power take-off shaft and on the sleeve can be varied to suit the torque to be transmitted and the clutch pedal operating forces required. Other sorts of dual clutches, for example with a foot-pedal-operated clutch on the sleeve and a completely independent hand-lever-operated clutch on the power take-off shaft, can be employed, or a power take-off can be dispensed with and a simple clutch solely for disengagably connecting the tractor's engine to its gearbox can be fitted.

What I claim is:

1. An engine/clutch combination comprising an engine flywheel, a shaft co-axial with the flywheel, clutch mechanism for disengagably connecting the flywheel to the shaft, a clutch housing enveloping the flywheel and the clutch mechanism and acting at its base as a sump, a trough within the housing forming a well accommodating the lower portions of the flywheel and the clutch mechanism and surrounded by oil in the sump, means defining an aperture in the trough adjacent that face of the flywheel remote from the clutch mechanism, an annular groove in said face of the flywheel for receiving oil flowing through the aperture from the sump, at least one passage in the flywheel for delivering oil from the groove to the clutch mechanism, and means for collecting oil flung from the trough by the flywheel and the clutch mechanism and for directing said flung oil toward said flywheel and clutch mechanism.

2. An engine/clutch combination according to claim 1, wherein said last-named means comprises at least one gutter within the upper part of the clutch housing.

3. An engine/clutch combination according to claim 2, wherein the aperture has a lip overhanging the annular groove.

4. An engine/clutch combination according to claim 3, wherein the gutter has closed ends and a pipe leads from that end remote from the engine to a point immediately above the lip.

5. An engine/clutch combination according to claim 2, wherein the gutter has closed ends and a pipe leading from that end remote from the engine discharges oil directly into the annular groove.

6. An engine/clutch combination according to claim 2, wherein the ends of the gutter extend beyond the ends of the trough and at least one of the first mentioned ends is open.

7. An engine/clutch combination according to claim 1, wherein the clutch mechanism includes at least one clutch plate mounted on the shaft and frictionally engagable between an axially movable pressure plate and the flywheel.

8. An engine/clutch combination according to claim 7, wherein a sleeve surrounding the shaft has mounted on it at least one clutch plate which is frictionally engagable by axial movement of another pressure plate when the clutch plate on the shaft is already engaged.

9. An engine/clutch combination according to claim 8, wherein the pressure plate associated with the clutch plate on the shaft has a conical internal surface on that side remote from the flywheel to assist in delivering oil to the clutch plate on the sleeve.

10. An engine/clutch combination according to claim 8, wherein a multi-plate clutch is provided on the sleeve.

11. An engine/clutch combination according to claim 1, wherein a single clutch plate is provided on the shaft.

12. An engine/clutch combination according to claim 1, wherein each clutch plate has so-called "paper" linings.

13. An engine/clutch combination according to claim 1, wherein each clutch plate has sintered bronze linings.

14. The engine/clutch combination defined in claim 1, wherein said aperture is a notch in the wall of said trough.

15. The engine/clutch combination defined in claim 1, wherein a lip is provided on the trough at said aperture over-hanging the annular groove and said flung oil is first directed to said lip.

16. The engine/clutch combination defined in claim 15, wherein said last-named means includes a pipe having an open end disposed for discharging collected oil onto said lip.

17. The engine/clutch combination defined in claim 1, wherein said last-named means includes a pipe having an open end disposed for discharging collected oil directly into said annular groove.

18. An engine/clutch combination comprising an engine flywheel, a shaft co-axial with the flywheel, clutch mechanism disengagably connecting the flywheel to the shaft, a clutch housing enveloping the flywheel and the clutch mechanism and acting at its base as a sump, a trough within the housing forming a well accommodating the lower portions of the flywheel and the clutch mechanism and surrounded by oil in the sump, means defining an aperture in the trough and a lip at said aperture extending toward that face of the flywheel remote from the clutch mechanism, an annular groove in said face of the flywheel for receiving oil flowing through the aperture and from the lip, at least one passage in the flywheel for delivering oil from the groove to the clutch mechanism, and means for collecting oil flung from the trough by the flywheel and the clutch mechanism 13 and directing the flung oil to said lip.

* * * * *